United States Patent [19]

Kotaka et al.

[11] Patent Number: 4,695,158

[45] Date of Patent: Sep. 22, 1987

[54] FOCUS ERROR DETECTOR

[75] Inventors: Fumitaka Kotaka; Takanori Maeda, both of Saitama, Japan

[73] Assignee: Pioneer Electronic Corporation, Tokyo, Japan

[21] Appl. No.: 707,553

[22] Filed: Mar. 4, 1985

[30] Foreign Application Priority Data

Mar. 2, 1984 [JP] Japan ................................ 59-40633

[51] Int. Cl.$^4$ ............................................. G01J 1/36
[52] U.S. Cl. ........................................ 356/123; 250/201; 369/45
[58] Field of Search ............... 356/125, 123; 250/201, 250/201 AF, 201 DF, 201 PF; 369/45, 46

[56] References Cited

U.S. PATENT DOCUMENTS 4,152,586  5/1979  Elliott et al. ................ 250/201 DF
4,546,460 10/1985  Ando ........................... 250/201 DF

FOREIGN PATENT DOCUMENTS 0088842  5/1983  Japan .............................. 250/201

Primary Examiner—F. L. Evans
Attorney, Agent, or Firm—Finnegan, Henderson, Farabow, Garrett and Dunner

[57] ABSTRACT

A focus error detector comprises an inner group of light detector elements formed in a circular area about a focus point of an illumination beam for generating a first focus error signal. A second group of light detector elements formed in an annular-shaped area around the circular area for generating a second focus error signal, an amplifier for amplifying the second error signal, and an adder for combining the first and second focus error signals to generate a composite focus error signal.

12 Claims, 12 Drawing Figures

FOCUS ERROR DETECTOR

FIELD OF THE INVENTION

This invention relates to a focus error detector and more particularly to a focus error detector in an optical information recording and regenerative apparatus.

BACKGROUND OF THE INVENTION

Up to this time, an apparatus as illustrated in FIG. 1 has been used as a focus error detector. In the illustration, a light source 1 transmits light that passes through a focusing lens 2. A half-mirror 3 is provided in the path of the light beam that passes through the focusing lens 2. An objective lens 4 causes light that is not reflected from the half-mirror 3 to be condensed as a spotlight with a very small diameter and to impinge upon an information storage surface 5a of a storage medium 5.

A part of the light is reflected by the information storage surface 5a of the storage medium 5 and passes back through the objective lens 4 and is reflected by the half-mirror 3 to a condenser 6. A cylindrical lens 7 gives an astigmatism to the reflected light passing through the condenser 6. Between two focus lines produced by non-point light fluxes passing through the cylindrical lens 7, that is, between the focus line fs in a sagittal direction and the focus line fm in a meridional direction, there exists a position where the light flux has a circular cross section. A light detector 8 is placed so that a light-receiving surface 8a is located at this position.

The light detector 8 is a device known as a quadrant-separated type detector consisting of four independent elements $8_1$ through $8_4$ arranged closely spaced but separate as shown in FIG. 2. Two perpendicularly intersecting straight lines form boundary lines. The light fluxes having an astigmatism enter this light detector 8 so that each of the focus lines fs and fm is in the direction shown in FIG. 2. In this case, the focus line fs causes the elements $8_1$ and $8_3$ to receive the maximum quantity of light and causes the elements $8_2$ and $8_4$ to receive the minimum quantity of light. For the focus line fm, the situation is the opposite.

The output signals from the elements $8_1$ and $8_3$ are added by the adder 9 while the output signals from the elements $8_2$ and $8_4$ are added by the adder 10. The sum-signals obtained from the adders 9 and 10 are subtracted by the subtracter 11. A difference-signal from the subtracter 11 is used as a focus error signal and focus control in the optical system shown in FIG. 1 is performed according to this focus error signal.

When the information storage surface 5a of the storage medium 5 is at a focusing position for the illumination beam, the reflected light fluxes are evenly distributed on the light-receiving surface 8a of the light detector 8 as shown graphically by oblique lines in FIG. 3(b). Therefore, the focus error signal FE is expressed as follows, where $A_1$ and $A_2$ represent the output signals of the elements $8_1$ and $8_3$, respectively, and $B_1$ and $8_3$ represent those of the elements $8_2$ and $8_4$, respectively:

$$FE = (A_1 + A_2) - (B_1 + B_2) = 0$$

On the contrary, if the above information storage surface is not at the focusing position, a distribution of the reflected fluxes will be as shown by oblique lines in FIGS. 3(a) and FIG. 3(c) resulting in FE>O of FE<O. As shown in FIG. 4, the focus error signal FE can be represented by an S curve. The sign and level of the signal FE changes are represented as a consequence of the direction and amount of a change in the distance between the illumination beam focusing point and the information storage surface 5a. The direction and the amount of focus offset are obtainable from the sign and level of the focus error signal FE.

In conventional detectors having the above explained structure, there is a defect which causes a focus drive mechanism servo system to be disengaged when a heavy shock or the like is applied to the system. The rate of increase in the focus error signal FE becomes small if the amount of focus offset becomes large to such an extent that the reflected light fluxes may overflow the light-receiving surface 8a of the light detector 8. The output of the detector becomes unreliable.

OBJECTS AND SUMMARY OF THE INVENTION

It is an object of the present invention to provide a focus error detector capable of detecting focusing errors in a wide range and of generating corresponding correction signals.

Another object of the present invention is a reliable focus error detector.

A further object of the present invention is a focus error detector that is not adversely affected by shocks.

Still another object of the present invention is a focus error detector for determining focusing errors and for generating focus control signals for correcting the focusing errors.

These and other objects are achieved by a focus error detector for generating a focus error signal having a value indicating the degree that a lens system is out of focus by processing an illumination beam emitted by the lens system, the detector comprising first means for determining the first cumulative offset of the illumination beam from a focus point for a first circular area corresponding to a first predetermined radial distance from the focus point and for generating a first signal having a magnitude proportional to the first offset, second means for determining the second cumulative offset of the illumination beam from the focus point for a second annular shaped area corresponding to a second predetermined radial distance from the focus point not less than the first predetermined radial distance and a third predetermined radial distance from the focus point greater than the second predetermined radial distance, and for generating a second signal having a magnitude proportional to the second offset, means for amplifying the second signal, and means for arithmetically combining the first and second signals to produce the focus error signal.

BRIEF DESCRIPTION OF THE DRAWINGS

The manner in which the above and other objects, features, and advantages are attained by the present invention, and the construction and operation of the present invention itself will become more apparent from consideration of the following detailed description when considered in view of the drawings, wherein.

DETAILED DESCRIPTION

Figure 5:
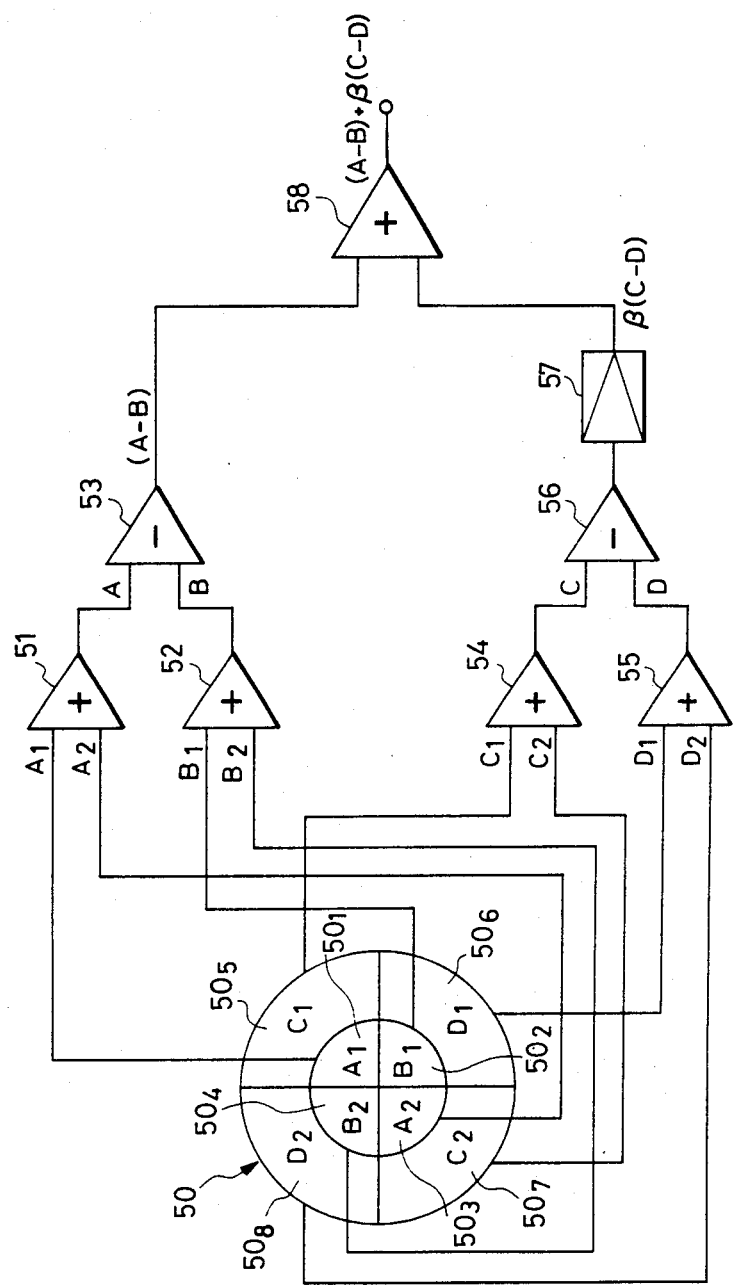
FIG. 5 is a circuit diagram of the focus error detector of the present invention.

An embodiment of the present invention is illustrated in FIG. 5. A light detector 50 comprises a first element group composed of four independent elements $50_1$ through $50_4$, which are quadrant-separated and arranged to form a circle. The detector 50 further includes a second element group composed of the four independent elements $50_5$ through $50_8$, which are arranged to form a doughnut or annular shape at the outside of the first element group. The light detector 50 is placed in a position between the two focus lines fs and fm produced by the light fluxes having an astigmatism under the focusing condition and at the point that the light flux cross section forms a circle.

The diameter of the circle formed by the elements $50_1$ through $50_4$ of the first element group is larger than the diameter of the light fluxes on the elements $50_1$ through $50_4$ in the properly focused condition and is smaller than the values of the lengths of the focus lines fs or fm. The inner diameter of the annular-shaped area formed by the elements $50_5$ through $50_8$ of the second element group is equal to or slightly larger than the diameter of the first element group. The outer diameter of the annular-shaped area becomes larger than the lengths of the focus lines fs or fm.

In the first element group, the respective output signals $A_1$ and $A_2$ of the elements $50_1$ and $50_3$ are added together by an adder 51 while the respective output signals $B_1$ and $B_2$ of the elements $50_2$ and $50_4$ are added together by an adder 52. The respective sum-signals A and B from the adders 51 and 52 are subtracted by a subtractor 53.

In the second element group, the respective output signals $C_1$ and $C_2$ of the elements $50_5$ and $50_7$ are added together by an adder 54 while the respective output signals $D_1$ and $D_2$ of the elements $50_6$ and $50_8$ are added together by an adder 55. The sum-signals C and D from the adders 54 and 55 are subtracted by a subtractor 56 and the difference signal is amplified by the amplifier 57 having an amplification factor of $\beta$. The output (A−B) of the subtractor 53 and the output ($\beta$(C−D)) of the amplifier 57 are added by the adder 58 that is used as an arithmetic circuit, and the output obtained as a result of this arithmetic operation, that is ((A−B)+$\beta$(C−D)), becomes the focus error signal FE.

Next, descriptions on the operation of the detector of the present invention are provided as follows.

Figure 1:
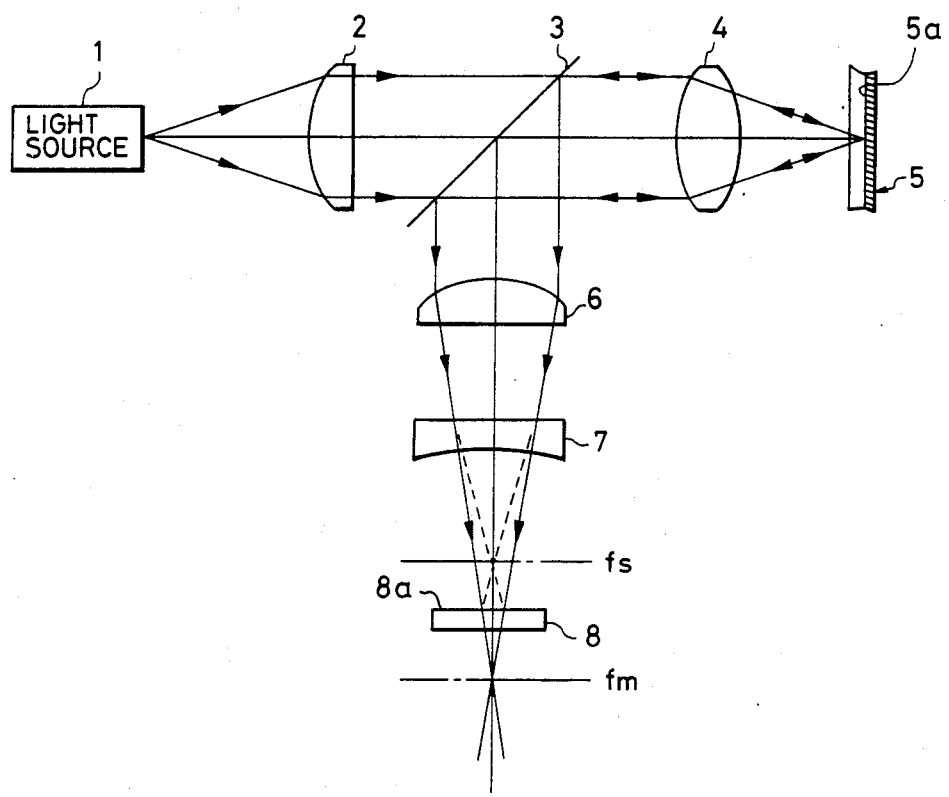
FIG. 1 is a schematic illustration of an optical system in an optical information recording and regeneration system.
Figure 6:
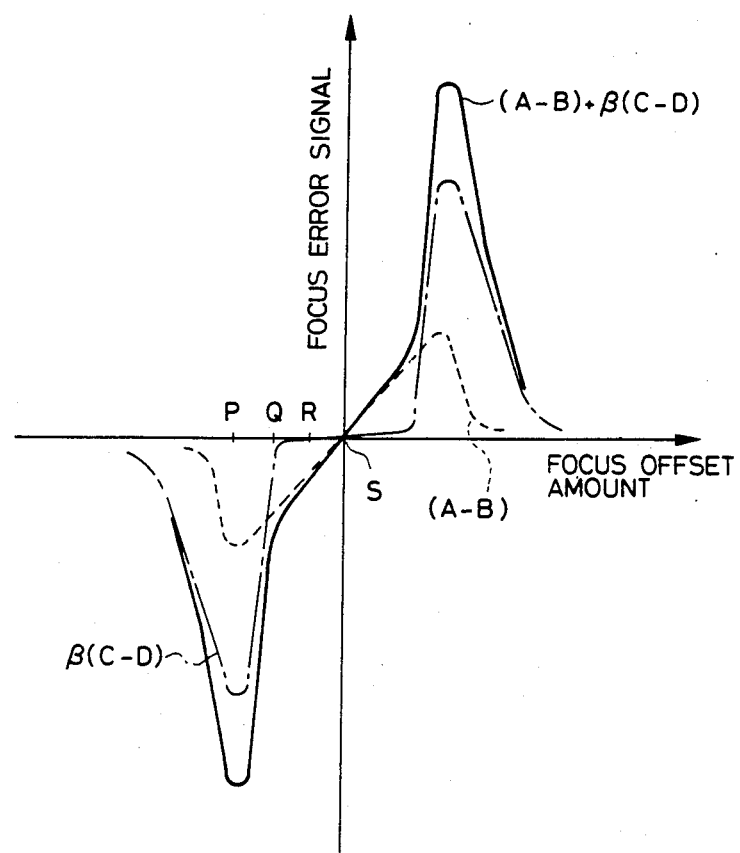
FIG. 6 is a waveform of signals produced by the detector circuit of FIG. 6.
Figure 7P:
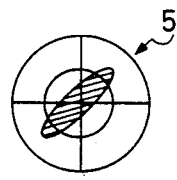
FIGS. 7(p) through 7(s) are graphical illustrations of shapes of fluxes on the light-receiving surfaces of the light detector of FIG. 5.
Figure 7Q:
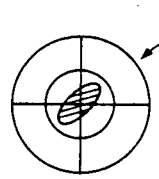
Figure 7R:
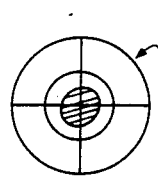
Figure 7S:
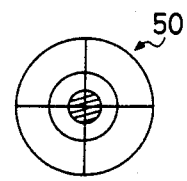

In FIG. 5, the output signal (A−B) of the subtracter 53 presents such variation as shown by a dotted line in FIG. 6 in response to a change in the distance between a focusing point of the illumination beam and the information storage surface 5a (illustrated in FIG. 1), that is, in response to focus offset. This signal, which is a first focusing position information signal, corresponds to a focus error signal obtained by the conventional means shown in FIG. 1.

Similar to the conventional devices described above, the present invention includes a means for generating an offset of the illumination beam in response to an out-of-focus condition. In the embodiment described herein, there is included an astigmatic lens that distorts the beam to generate an offset when the lens is in an out-of-focus position.

The output signal (C−D) of the subtractor 56 is almost zero because little light enters the elements $50_5$ through $50_8$ within a range where the focus offset is small and the flux section is smaller than the external form of the elements $50_1$ through $50_4$. However, the output signal (C−D) having a level corresponding to the amount of focus offset is obtained if the above range is exceeded. Then such variation, as shown by the alternate long and short dash lines in FIG. 6, is produced because the signal is multiplied by $\beta$ by the amplifier 57.

The output signal ($\beta$(C−D)) of the amplifier 57 is a second focusing position information signal and, as apparent from FIG. 6, a level change with respect to the amount of focus offset becomes larger than the output signal (A−B) of the subtractor 53 if the above range is exceeded. By adding the respective output signals of the subtractor 53 and the amplifier 57 by use of an adder 58, the focus error signal FE is obtained.

As shown by a solid line in FIG. 6, this focus error signal FE has very large ratio of increase in level change with respect to the amount of focus offset in the range where the focus offset is large. The focus error signal FE, as a distribution of the fluxes on the light-receiving surface of the light detector 50 shown in FIG. 5, corresponds to an amount of focus offset at each of the points, P, Q, R, and S in FIG. 6 and it varies as shown by oblique lines in FIG. 7. That is, the focus servo system operation within the range from the point S to the point Q, is performed according to the focus error signal which is almost the same as that of the conventional detector. The output signal (A−B) of the subtractor 53 is dominant because the output signal ($\beta$(C−D)) of the amplifier 57 is almost zero within the above range from the point S to the point Q. When the focus offset is larger than that corresponding to the point Q, the output signal ($\beta$(C−D)) of the amplifier 57 becomes dominant. This output signal is added to the output signal (A−B) of the subtractor 53 causing the rate of increase of the focus error signal to become relatively large.

It should be noted in the above embodiment that the descriptions were provided concerning the application of the present invention to an optical system using the astigmatism method. The present invention, however, is also applicable to optical systems using a knife edge method or a wedge prism method and the same effect as that of the above embodiment is obtainable by providing a detecting unit which works when the amount of a focus offset exceeds a predetermined amount.

Figure 2:
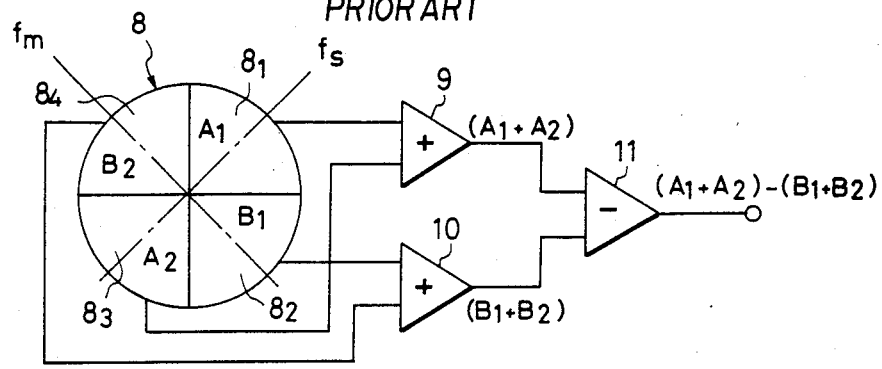
FIG. 2 is a diagram showing a circuit of a conventional focus error detector.
Figure 3A:
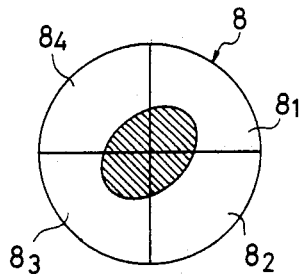
FIG. 3(a) through 3(c) are graphical illustrations of the shapes of light fluxes on the light-receiving surface of a conventional focus error detector.
Figure 3B:
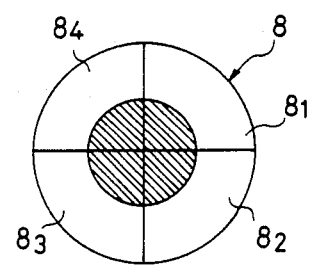
Figure 3C:
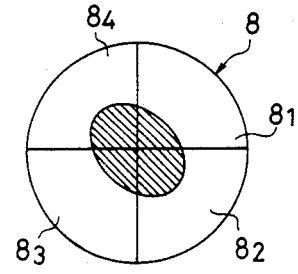
Figure 4:
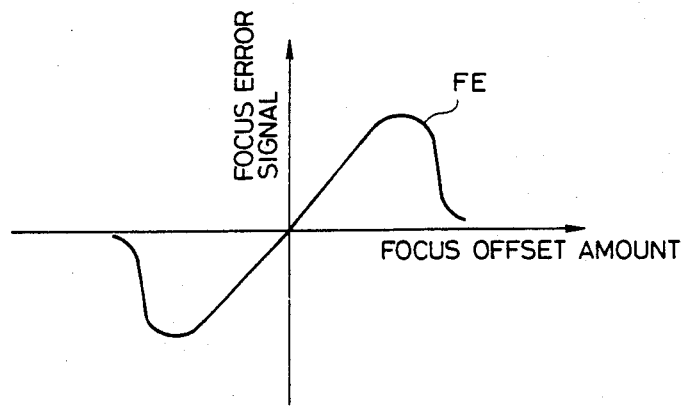
FIG. 4 is a waveform of a focus error signal produced by the detector circuit of FIG. 2.

It should also be noted in the above embodiment that the focus error signal shown by a solid line in FIG. 6 was obtained by use of the light detector 50 consisting of first and second groups of detector elements. It is also electrically possible to obtain the focus error signal shown by a solid line in FIG. 6 by replacing the present light detector with the conventional type detector shown in FIG. 2 and by using a non-linear type amplifier, for example, having a gain increased in the region where the input signal level is large. In addition, for the structure of the light detector 50, it is not limited to a dual-structure but a triple-structure may also be employed.

What is claimed is:

1. A focus error detector for generating a focus error signal having a value indicating the degree that a lens system is out of focus by processing an illumination beam emitted by the lens system, the detector comprising:
   means for generating an offset of said illumination beam in response to an out of focus condition;
   first means for determining the first cumulative offset of the illumination beam from a focus point for a first circular area corresponding to a first predetermined radial distance from said focus point and for generating a first signal having a magnitude proportional to said first offset;
   second means for determining the second cumulative offset of the illumination beam from said focus point for a second annular-shaped area corresponding to a second predetermined radial distance from said focus point not less than said first predetermined radial distance and a third predetermined radial distance from said focus point greater than said second predetermined radial distance, and for generating a second signal having a magnitude proportional to said second offset;
   means for amplifying said second signal; and
   means for arithmetically combining said first and second signals to produce the focus error signal.

2. A detector according to claim 1, wherein said first means comprises a first composite detector including:
   first, second, third and fourth light sensitive elements arranged to form a circle about said focus point, each of said first to fourth elements corresponding to a different quadrant of said circle and for generating a corresponding output signal corresponding to the amount of light of said illumination beam striking that element;
   a first adder for adding the corresponding output signals of said first and second elements;
   a second adder for adding the corresponding output signals of said third and fourth elements; and
   a first subtractor for subtracting the output of said first adder from the output of said second adder to produce said first signal.

3. A detector according to claim 2, wherein said second means comprises a second composite detector including:
   fifth, sixth, seventh, and eighth light sensitive elements arranged to form said annular-shaped area about said focus point, each of said fifth to eighth elements corresponding to a different quadrant of said annular-shaped area and for generating a corresponding output signal corresponding to the amount of light of said illumination beam striking that element;
   a third adder for adding the corresponding output signals of said fifth and sixth elements;
   a fourth adder for adding the corresponding output signals of said seventh and eighth elements; and
   a second subtractor for subtracting the output of said third adder from the output of said fourth adder to produce said second signal.

4. A detector according to claim 1, wherein said combining means comprises a means for adding said first and second signals.

5. The detector of claim 2, wherein said second offset detecting means comprises a second composite detector including:
   fifth, sixth, seventh, and eighth light sensitive elements arranged to form said annular-shaped area about said focus point, each of said fifth to eighth elements corresponding to a different quadrant of said annular-shaped area and for generating a corresponding output signal corresponding to the amount of light of said illumination beam striking that element.

6. The detector of claim 5, wherein said detector includes:
   a third adder for adding the corresponding output signals of said fifth and sixth elements;
   a fourth adder for adding the corresponding output signals of said seventh and eighth elements; and
   a second subtractor for subtracting the output of said third adder from the output of said fourth adder to produce said second offset signal.

7. A focus error detector for generating a focus error signal proportional to the focus error of a lens system with respect to a reflective surface, said detector comprising:
   means for producing an illumination beam reflected from said surface and emitted from said lens system;
   means for offsetting said illumination beam in response to focus error of said lens system with respect to said surface;
   first offset detecting means receiving said illumination beam and generating a first offset signal in proportion to the offset of the illumination beam impinging thereon;
   second offset detecting means surrounding said first offset detecting means for receiving portions of said illumination beam outside that portion of said illumination beam impinging on said first offset detecting means, said second offset detecting means generating a second offset signal in proportion to the offset of the illumination beam impinging on said second offset detecting means;
   means for amplifying said second offset signal; and
   means for arithmatically combining said first and second offset signals to produce said focus error signal.

8. The focus error detector of claim 7, wherein said first offset detecting means comprises a generally circular detector having a plurality of detecting elements, the center of said detector being the focus point of said illumination beam.

9. The focus error detector of claim 8, wherein said second offset detecting means comprises an annular detector having a plurality of detecting elements.

10. The detector of claim 8, wherein said first offset detecting means comprises a first composite detector including:
    first, second, third and fourth light sensitive elements arranged to form a circle about said focus point, each of said first to fourth elements corresponding to a different quadrant of said circle, each of said elements generating a corresponding output signal corresponding to the amount of light of said illumination beam striking that element.

11. The detector of claim 10, wherein said detector includes:
    a first adder for adding the corresponding output signals of said first and second elements;

a second adder for adding the corresponding output signals of said third and fourth elements; and a first subtractor for subtracting the output of said first adder from the output of said second adder to produce said first offset signal.

12. The detector of claim 7, wherein said combining means comprises means for adding said first and second offset signals.

* * * * *